(12) United States Patent
Matsushita et al.

(10) Patent No.: US 11,584,394 B2
(45) Date of Patent: Feb. 21, 2023

(54) VEHICLE CONTROLLER DEVICE AND VEHICLE CONTROL SYSTEM

(71) Applicant: TOYOTA JIDOSHA KABUSHIKI KAISHA, Toyota (JP)

(72) Inventors: Makoto Matsushita, Ichinomiya (JP); Atsushi Hanawa, Miyoshi (JP); Yasuki Nakagawa, Toyota (JP); Yusuke Yokota, Susono (JP); Tomoyuki Kuriyama, Hadano (JP); Tae Sugimura, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 9 days.

(21) Appl. No.: 16/910,771

(22) Filed: Jun. 24, 2020

(65) Prior Publication Data

US 2021/0016799 A1 Jan. 21, 2021

(30) Foreign Application Priority Data

Jul. 16, 2019 (JP) .............................. JP2019-131386

(51) Int. Cl.
*B60W 60/00* (2020.01)
*B60W 50/14* (2020.01)
*G05D 1/00* (2006.01)
*B60W 50/00* (2006.01)

(52) U.S. Cl.
CPC ........ *B60W 60/0016* (2020.02); *B60W 50/14* (2013.01); *G05D 1/0011* (2013.01);
(Continued)

(58) Field of Classification Search
CPC ............. B60W 60/0016; B60W 50/14; B60W 2420/52; B60W 2555/20; B60W 2556/55;
(Continued)

(56) References Cited

U.S. PATENT DOCUMENTS

2018/0356814 A1* 12/2018 Brooks ................ A61B 5/0205
2019/0011918 A1* 1/2019 Son ..................... G01C 21/3617
(Continued)

FOREIGN PATENT DOCUMENTS

JP 2006-277538 A 10/2006
JP 2011-048448 A 3/2011
(Continued)

OTHER PUBLICATIONS

Japanese Office Action for JP 2019-131386 dated May 26, 2022 (Year: 2022).*

*Primary Examiner* — Peter D Nolan
*Assistant Examiner* — Tanya C Sienko
(74) *Attorney, Agent, or Firm* — Oliff PLC

(57) ABSTRACT

A vehicle controller device including: a communication section configured to receive operation information to operate a vehicle from an operation device located externally to the vehicle; a first memory; and a first processor, the first processor being configured to: acquire peripheral information regarding a periphery of the vehicle from a peripheral information detection section; generate a travel plan for the vehicle based on the peripheral information of the vehicle; control autonomous driving in which the vehicle travels based on the generated travel plan and also control remote driving in which the vehicle travels based on the received operation information; predict that a compromised state in which autonomous driving of the vehicle becomes compromised will arise based on environmental information including meteorological information received by the communication section; and notify the operation device of the compromised state in a case in which the compromised state has been predicted to arise.

16 Claims, 12 Drawing Sheets

(52) U.S. Cl.
CPC . *B60W 2050/0075* (2013.01); *B60W 2420/42* (2013.01); *B60W 2420/52* (2013.01); *B60W 2555/20* (2020.02); *B60W 2556/55* (2020.02); *B60W 2556/65* (2020.02)

(58) Field of Classification Search
CPC ....... B60W 2556/65; B60W 60/00182; B60W 60/001; B60W 60/0015; B60W 60/005; B60W 60/0053; B60W 60/007; G05D 1/0011
See application file for complete search history.

(56) References Cited

U.S. PATENT DOCUMENTS

| | | | | |
|---|---|---|---|---|
| 2019/0361432 | A1* | 11/2019 | Levinson | G06N 7/005 |
| 2020/0142395 | A1* | 5/2020 | Delbari | B60W 30/06 |
| 2020/0310417 | A1* | 10/2020 | Pedersen | G05D 1/0027 |
| 2021/0142526 | A1* | 5/2021 | Mantyjarvi | B60W 50/0097 |
| 2021/0155269 | A1* | 5/2021 | Oba | H04W 4/44 |
| 2021/0163021 | A1* | 6/2021 | Frazzoli | B60W 60/0015 |
| 2021/0179146 | A1* | 6/2021 | Nishida | B60W 60/0055 |
| 2021/0362598 | A1* | 11/2021 | Oh | B60W 60/001 |
| 2021/0380144 | A1* | 12/2021 | Miki | B60W 60/0053 |
| 2022/0126864 | A1* | 4/2022 | Moustafa | B60W 60/001 |

FOREIGN PATENT DOCUMENTS

| | | | |
|---|---|---|---|
| JP | 2012-185684 | A | 9/2012 |
| JP | 2018-151908 | A | 9/2018 |
| JP | 2018151908 | A * | 9/2018 |
| JP | 2019-039930 | A | 3/2019 |
| KR | 20150084143 | A * | 7/2015 |

* cited by examiner

VEHICLE CONTROLLER DEVICE AND VEHICLE CONTROL SYSTEM

CROSS-REFERENCE TO RELATED APPLICATION

This application is based on and claims priority under 35 USC 119 from Japanese Patent Application No. 2019-131386 filed on Jul. 16, 2019, the disclosure of which is incorporated by reference herein.

BACKGROUND

Technical Field

The present disclosure relates to a vehicle controller device and a vehicle control system capable of implementing autonomous driving and remote driving.

Related Art

Japanese Patent Application Laid-Open (JP-A) No. 2011-48448 discloses a remote control system applied to a vehicle capable of autonomous driving and remote driving. When reception of control commands transmitted from a remote control device is interrupted and then recovers, a travel route prior to the interruption is restored. In this remote control system, autonomous driving is performed when the reception of the control commands is interrupted.

However, the vehicle of JP-A No. 2011-48448 would stop where it is if sensors were to lose function and autonomous driving became compromised, for example due to poor visibility in the event of a disaster.

There is thus room for improvement with respect to avoiding being caught up in a disaster.

SUMMARY

An object of the present disclosure is to provide a vehicle controller device and a vehicle control system capable of maintaining vehicle travel in at least one case out of cases in which sensors will lose function or cases in which sensors have lost function, for example due to poor visibility in the event of a disaster.

A first aspect is a vehicle controller device including a communication section configured to receive operation information to operate a vehicle from an operation device located externally to the vehicle, an acquisition section configured to acquire peripheral information regarding a periphery of the vehicle from a peripheral information detection section, a travel plan generation section configured to generate a travel plan for the vehicle based on the peripheral information of the vehicle, a travel control section configured to control autonomous driving in which the vehicle travels based on the travel plan generated by the travel plan generation section and also control remote driving in which the vehicle travels based on the operation information received by the communication section, a prediction section configured to predict that a compromised state in which autonomous driving of the vehicle becomes compromised will arise based on environmental information including meteorological information received by the communication section, and a notification section configured to notify the operation device of the compromised state in a case in which the compromised state has been predicted to arise by the prediction section.

In the vehicle controller device of the first aspect, the travel control section is capable of implementing autonomous driving and remote driving. Note that autonomous driving is implemented based on the peripheral information acquired from the peripheral information detection section by the acquisition section, and the travel plan generated by the travel plan generation section. Remote driving is implemented based on the operation information transmitted by the operation device and received by the communication section. In this vehicle controller device, the notification section notifies the operation device of the compromised state in cases in which autonomous driving of the vehicle is forecast to become compromised by the prediction section based on the environmental information. This enables the vehicle to start to be remotely driven by the operation device that has been notified of the compromised state. Namely, the vehicle controller device is capable of maintaining travel of the vehicle by remote driving even in cases in which the peripheral information detection section will stop functioning due to poor visibility or the like in the event of a natural disaster or man-made disaster predicted to occur in the near future.

A vehicle controller device of a second aspect is the vehicle controller device of the first aspect, further including a state determination section configured to determine whether or not the compromised state currently exists based on an acquisition state of the peripheral information by the acquisition section. The notification section is configured to notify the operation device of the compromised state in a case in which the compromised state has been determined to exist by the state determination section.

In the vehicle controller device of the second aspect, the notification section notifies the operation device of the compromised state in cases in which the acquisition section is unable to acquire the peripheral information. This enables the vehicle to start to be remotely driven by the operation device that has been notified of the compromised state. Namely, the vehicle controller device is capable of maintaining travel of the vehicle by remote driving in cases in which the peripheral information detection section has stopped functioning due to poor visibility or the like in the event of a natural disaster or man-made disaster that is currently occurring, as well as in the event of a natural disaster or man-made disaster predicted to occur in the near future.

A vehicle controller device of a third aspect is the vehicle controller device of the first or the second aspect, further including a storage section at which the compromised state predicted by the prediction section and the environmental information on which such prediction was based are stored in an associated state. The prediction section is further configured to perform a new compromised state prediction based on a past prediction result stored in the storage section.

In the vehicle controller device of the third aspect, by storing the compromised state and the environmental information in the storage section as a past prediction result, the past prediction result can be utilized when performing a new compromised state prediction. The vehicle controller device thereby enables accuracy to be improved when the prediction section performs a compromised state prediction.

A fourth aspect is a vehicle controller device including a communication section configured to receive operation information to operate a vehicle from an operation device located externally to the vehicle, an acquisition section configured to acquire peripheral information regarding a periphery of the vehicle from a peripheral information detection section, a travel plan generation section configured to generate a travel plan for the vehicle based on the peripheral information of the vehicle, a travel control section configured to control autonomous driving in which the vehicle travels based on the travel plan generated by the travel plan generation section and also control remote driving in which the vehicle travels based on the operation information received by the communication section, a state determination section configured to determine whether or not a compromised state in which autonomous driving of the vehicle has become compromised currently exists based on an acquisition state of the peripheral information by the acquisition section, and a notification section configured to notify the operation device of the compromised state in a case in which the compromised state has been determined to exist by the state determination section.

In the vehicle controller device of the fourth aspect, the travel control section is capable of implementing autonomous driving and remote driving. The definitions of autonomous driving and remote driving are as previously described. In this vehicle controller device, the notification section notifies the operation device of the compromised state in cases in which the state determination section has determined that compromised state currently exists based on the acquisition state of peripheral information by the acquisition section. This enables the vehicle to start to be remotely driven by the operation device that has been notified of the compromised state. Namely, the vehicle controller device is capable of maintaining travel of the vehicle by remote driving in cases in which the peripheral information detection section has stopped functioning due to poor visibility or the like in the event of a natural disaster or man-made disaster that is currently occurring.

A vehicle controller device of a fifth aspect is the vehicle controller device of any one of the first to the fourth aspects, wherein the communication section is configured to transmit information relating to the compromised state to another vehicle at the periphery of the vehicle.

In the vehicle controller device of the fifth aspect, the communication section transmits the compromised state information to a vehicle approaching a point where autonomous driving of the vehicle is forecast to become compromised, or has already become compromised. This enables the vehicle receiving the compromised state information to avoid being caught up in a disaster.

A vehicle controller device of a sixth aspect is the vehicle controller device of any one of the first to the fifth aspects, further including an authority conferring section configured to confer authority to operate the vehicle on a remote operator that operates the operation device. The communication section is further configured to receive the operation information from the operation device operated by the remote operator conferred with the authority.

In the vehicle controller device of the sixth aspect, the authority conferring section confers authority to operate the vehicle on the remote operator who is to operate the operation device. The vehicle controller device thereby enables remote operation to be executed by a pre-designated remote operator.

The present disclosure enables vehicle travel to be maintained in at least one case out of cases in which sensors will lose function or cases in which sensors have lost function, for example due to poor visibility in the event of a disaster.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
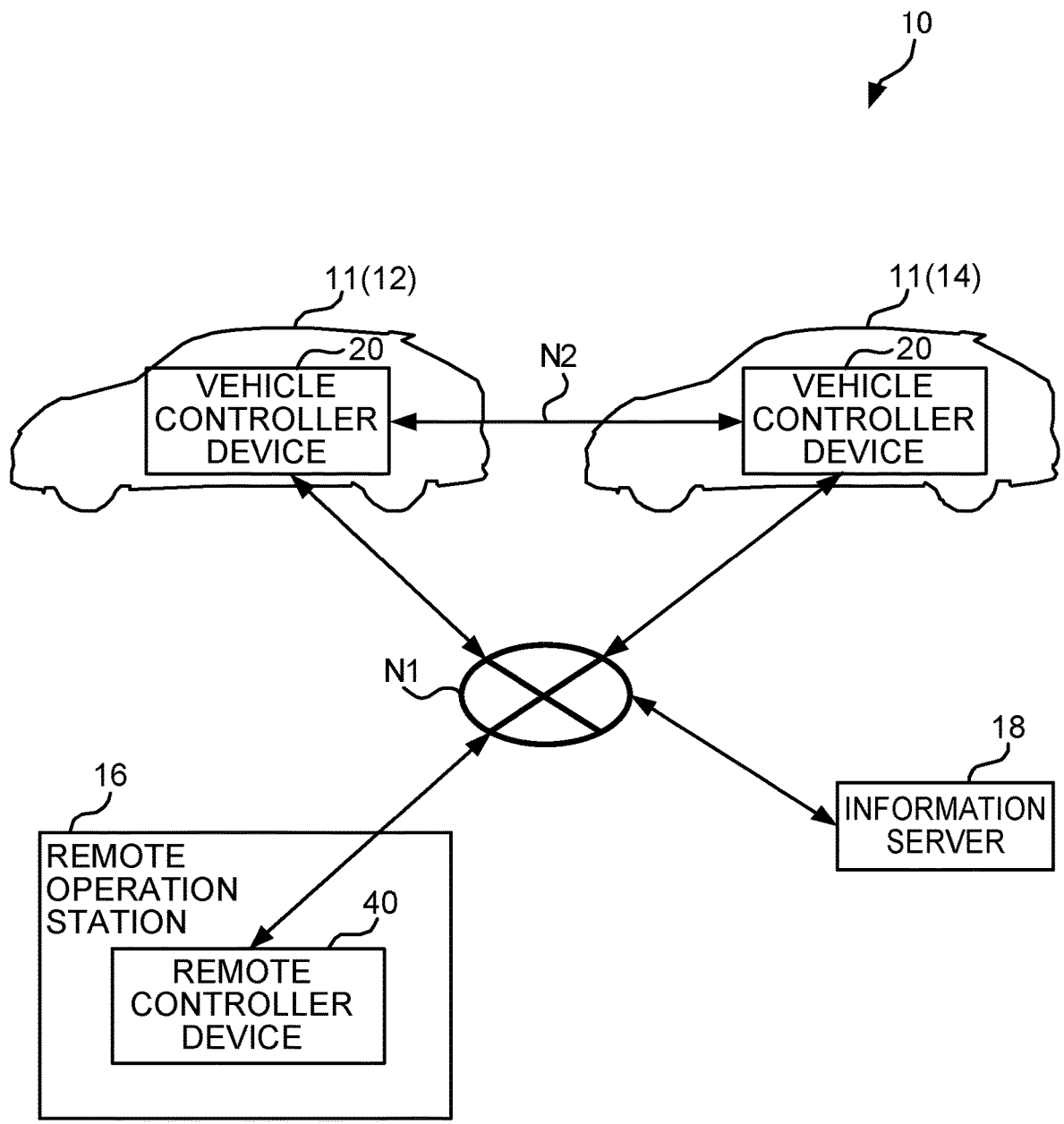
FIG. 1 is a diagram illustrating schematic configuration of a vehicle control system according to a first exemplary embodiment.

FIG. 1 is a block diagram illustrating schematic configuration of a vehicle control system 10 according to a first exemplary embodiment.

Outline

As illustrated in FIG. 1, the vehicle control system 10 according to the first exemplary embodiment is configured including autonomous driving-enabled vehicles 11, a remote operation station 16 serving as an operation device, and an information server 18. The autonomous driving-enabled vehicles 11 of the present exemplary embodiment include a given vehicle 12 serving as a vehicle, and another vehicle 14 serving as another vehicle.

The given vehicle 12 and the other vehicle 14 of the present exemplary embodiment each include a vehicle controller device 20. The remote operation station 16 includes a remote controller device 40. The vehicle controller device 20 of the given vehicle 12, the vehicle controller device 20 of the other vehicle 14, the remote controller device 40 of the remote operation station 16, and the information server 18 of the vehicle control system 10 are connected together through a network N1. The respective vehicle controller devices 20 are also capable of communicating with each other directly using inter-vehicle communication N2.

Although the vehicle control system 10 in FIG. 1 is configured by two of the autonomous driving-enabled vehicles 11 (the given vehicle 12 and the other vehicle 14), the one remote operation station 16, and the one information server 18, the numbers of each are not limited thereto. The vehicle control system 10 may include three or more of the autonomous driving-enabled vehicles 11, and may include two or more of both the remote operation stations 16 and the information servers 18.

The given vehicle 12 is capable of implementing autonomous driving in which the given vehicle 12 travels independently based on a travel plan pre-generated by the vehicle controller device 20, remote driving based on operation by a remote driver at the remote operation station 16, and manual driving based on operation by an occupant (namely, a driver) of the given vehicle 12. Note that the other vehicle 14 is also capable of implementing autonomous driving by the vehicle controller device 20, remote driving, and manual driving, similarly to the given vehicle 12.

Autonomous Driving-Enabled Vehicle

Figure 2:
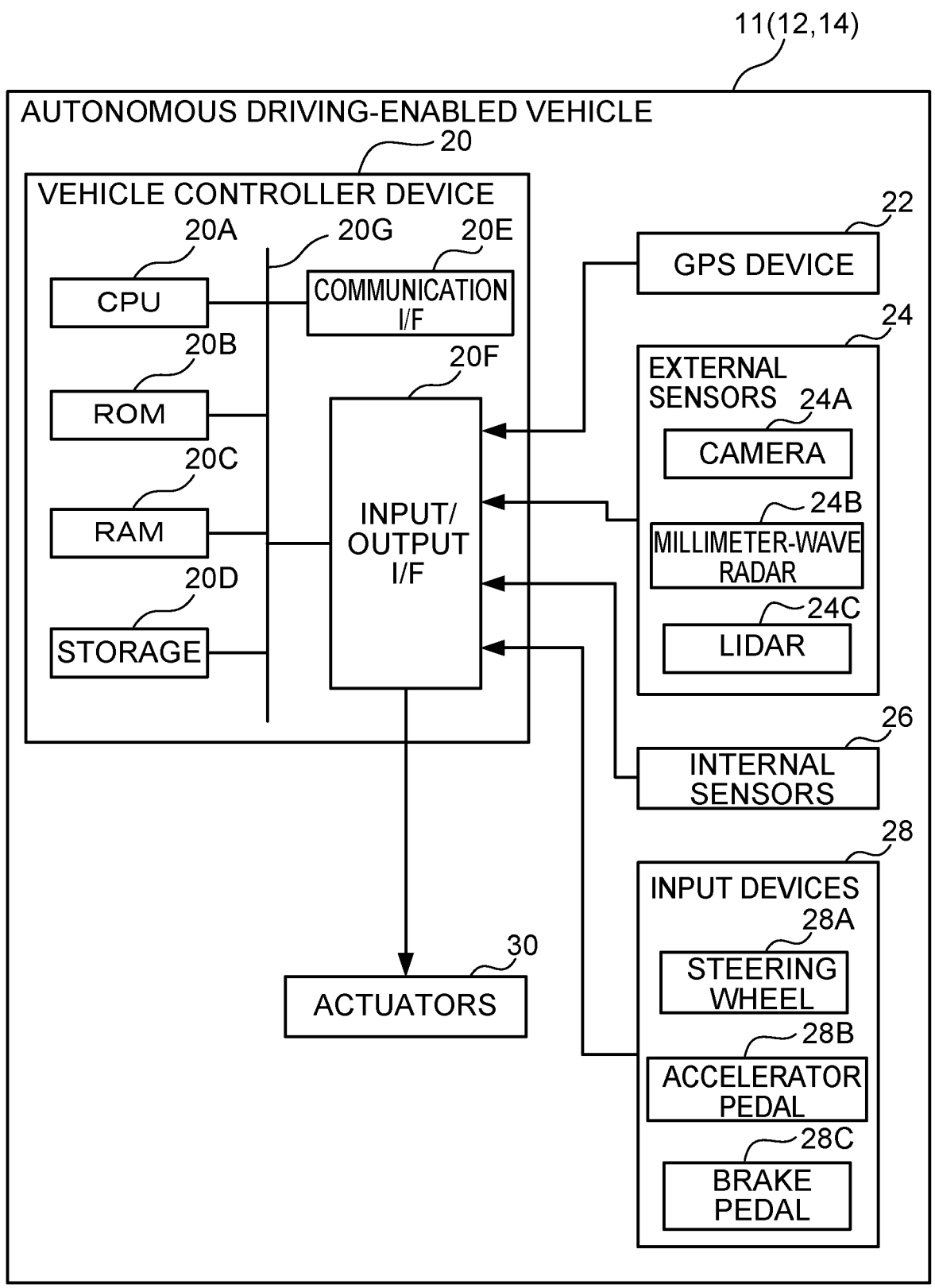
FIG. 2 is a block diagram illustrating hardware configuration of a vehicle of the first exemplary embodiment.

FIG. 2 is a block diagram illustrating hardware configuration of equipment installed in each of the autonomous driving-enabled vehicles 11 in the present exemplary embodiment. Note that since the given vehicle 12 and the other vehicle 14 configuring the autonomous driving-enabled vehicles 11 of the present exemplary embodiment have similar configurations to each other, only the given vehicle 12 will be explained herein. In addition to the vehicle controller device 20 described above, the given vehicle 12 also includes a global positioning system (GPS) device 22, external sensors 24, internal sensors 26, input devices 28, and actuators 30.

The vehicle controller device 20 is configured including a central processing unit (CPU) 20A, read only memory (ROM) 20B, random access memory (RAM) 20C, storage 20D, a communication interface (I/F) 20E, and an input/output I/F 20F. The CPU 20A, the ROM 20B, the RAM 20C, the storage 20D, the communication I/F 20E and the input/output I/F 20F are connected together so as to be capable of communicating with each other through a bus 20G The CPU 20A is an example of a first processor, and the RAM 20C is an example of first memory.

Figure 3:
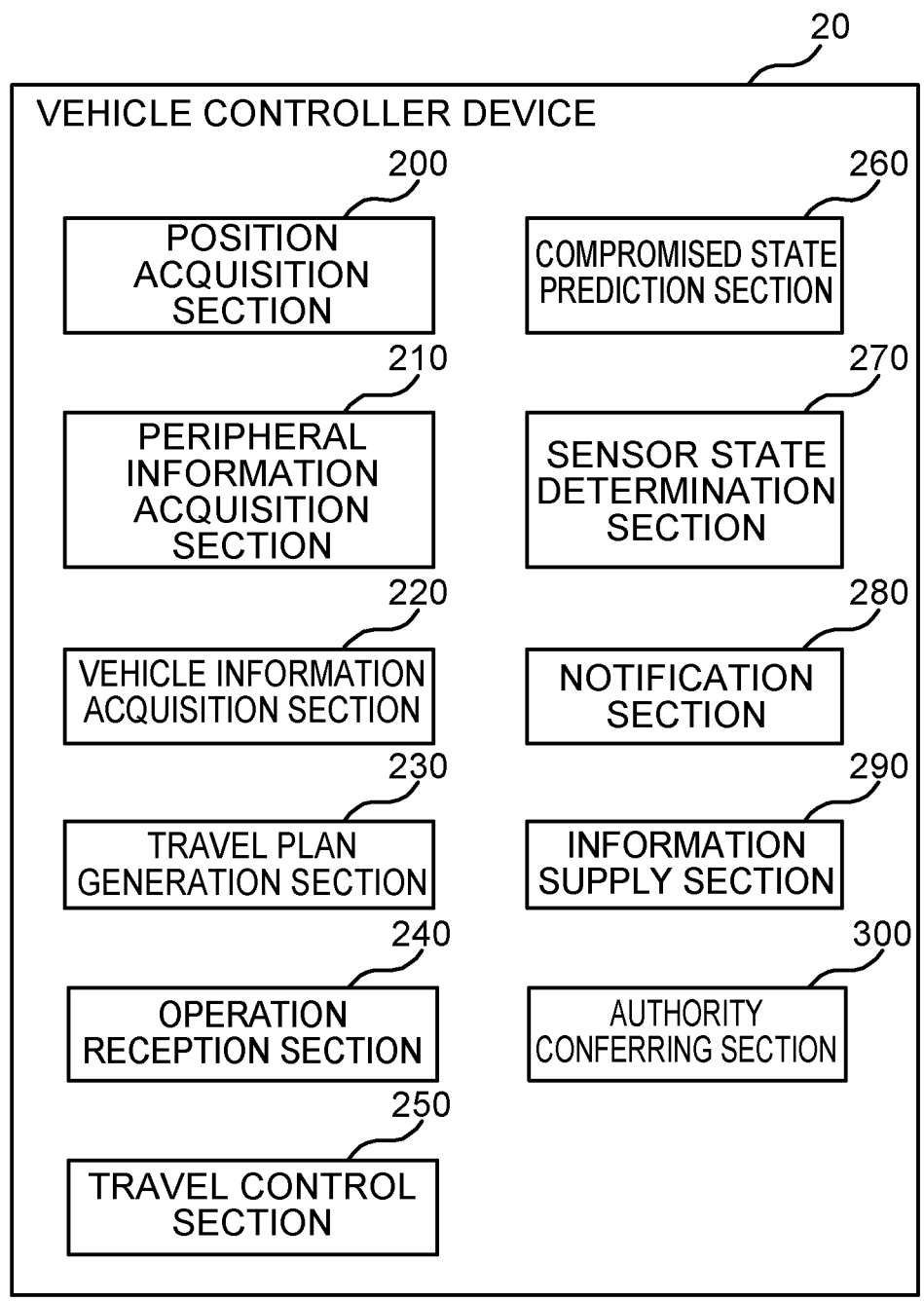
FIG. 3 is a block diagram illustrating an example of functional configuration of a vehicle controller device of the first exemplary embodiment.

The CPU 20A is a central processing unit that executes various programs and controls various sections. Namely, the CPU 20A reads a program from the ROM 20B and executes the program, using the RAM 20C as a workspace. In the present exemplary embodiment, an execution program is stored in the ROM 20B. When the CPU 20A executes the execution program, the vehicle controller device 20 functions as a position acquisition section 200, a peripheral information acquisition section 210, a vehicle information acquisition section 220, a travel plan generation section 230, an operation reception section 240, a travel control section 250, a compromised state prediction section 260, a sensor state determination section 270, a notification section 280, an information supply section 290, and an authority conferring section 300, as illustrated in FIG. 3.

As illustrated in FIG. 2, the ROM 20B stores various programs and various data. The RAM 20C serves as a workspace to temporarily store the programs or data.

The storage 20D serves as a storage section, is configured by a hard disk drive (HDD) or a solid state drive (SSD), and stores various programs including an operating system, as well as various data. Information relating to a compromised state and environmental information, described later, are stored in an associated state in the storage 20D.

The communication I/F 20E serves as a communication section, and includes an interface for connecting to the network N1 in order to communicate with the other vehicle controller device 20, the remote controller device 40, the information server 18, and the like. A communication protocol such as LTE or Wi-Fi (registered trademark) is employed as the interface. Moreover, the communication I/F 20E includes a wireless device to communicate directly with the other vehicle controller device 20 using the inter-vehicle communication N2, employing dedicated short range communications (DSRC) or the like.

The communication I/F 20E of the present exemplary embodiment transmits an image captured by a camera 24A to the remote operation station 16 located externally to the given vehicle 12, and receives remote operation information, this being operation information to operate the given vehicle 12, from the remote operation station 16 through the network N1. The communication I/F 20E also receives environmental information from the information server 18 through the network N1. The environmental information includes meteorological information such as temperature, wind speed, and precipitation amounts, earthquake information such as seismic intensity and tsunami information, and traffic information such as congestion, accident, and roadwork information. The communication I/F 20E also transmits information relating to the compromised state, described later, to the other vehicle 14, this being another vehicle, using the inter-vehicle communication N2.

The input/output I/F 20F is an interface for communicating with the various devices installed in the given vehicle 12. In the vehicle controller device 20 of the present exemplary embodiment, the GPS device 22, the external sensors 24, the internal sensors 26, the input devices 28, and the actuators 30 are connected through the input/output I/F 20F. Note that the GPS device 22, the external sensors 24, the internal sensors 26, the input devices 28, and the actuators 30 may be directly connected together through the bus 20G.

The GPS device 22 is a device for measuring the current position of the given vehicle 12. The GPS device 22 includes an antenna to receive signals from GPS satellites.

The external sensors 24 serve as a peripheral information detection section, and are a group of sensors that detect peripheral information regarding the periphery of the given vehicle 12. The external sensors 24 include the camera 24A that images a predetermined range, millimeter-wave radar 24B that transmits scanning waves over a predetermined range and receives the reflected waves, and laser imaging detection and ranging (LIDAR) 24C that scans a predetermined range. Note that plural of the cameras 24A may be provided. In such cases, a first camera 24A may be an autonomous driving camera used to capture images employed in autonomous driving, and a second camera 24A may be a remote driving camera used to capture images for transmission to the remote operation station 16. One out of the autonomous driving camera 24A or the remote driving camera 24A may be configured by a visible light camera, and the other by an infrared camera.

The internal sensors 26 are a group of sensors that detect travel states of the given vehicle 12. The internal sensors 26 include at least one out of a vehicle speed sensor, an acceleration sensor, or a yaw rate sensor.

The input devices 28 are a group of switches to be operated by the occupant on board the given vehicle 12. The input devices 28 include a steering wheel 28A serving as a switch to steer the steered wheels of the given vehicle 12, an accelerator pedal 28B serving as a switch to cause the given vehicle 12 to accelerate, and a brake pedal 28C serving as a switch to cause the given vehicle 12 to decelerate.

The actuators 30 include a steering wheel actuator to drive the steered wheels of the given vehicle 12, an accelerator actuator to control acceleration of the given vehicle 12, and a brake actuator to control deceleration of the given vehicle 12.

FIG. 3 is a block diagram illustrating an example of functional configuration of the vehicle controller device 20. As illustrated in FIG. 3, the vehicle controller device 20 includes the position acquisition section 200, the peripheral information acquisition section 210, the vehicle information acquisition section 220, the travel plan generation section 230, the operation reception section 240, the travel control section 250, the compromised state prediction section 260, the sensor state determination section 270, the notification section 280, the information supply section 290, and the authority conferring section 300. Each of these functional configurations is implemented by the CPU 20A reading the execution program stored in the ROM 20B, and executing this program.

The position acquisition section 200 includes functionality to acquire the current position of the given vehicle 12. The position acquisition section 200 acquires position information from the GPS device 22 through the input/output I/F 20F.

The peripheral information acquisition section 210 serves as an acquisition section, and includes functionality to acquire peripheral information regarding the periphery of the given vehicle 12. The peripheral information acquisition section 210 acquires peripheral information regarding the given vehicle 12 from the external sensors 24 through the input/output I/F 20F. The "peripheral information" includes not only information regarding vehicles and pedestrians in the periphery of the given vehicle 12, but also regarding the weather, brightness, road width, obstacles, and so on.

The vehicle information acquisition section 220 includes functionality to acquire vehicle information such as the vehicle speed, acceleration, yaw rate, and so on of the given vehicle 12. The vehicle information acquisition section 220 acquires the vehicle information regarding the given vehicle 12 from the internal sensors 26 through the input/output I/F 20F.

The travel plan generation section 230 includes functionality to generate a travel plan to cause the given vehicle 12 to travel based on the position information acquired by the position acquisition section 200, the peripheral information acquired by the peripheral information acquisition section 210, and the vehicle information acquired by the vehicle information acquisition section 220. The travel plan includes not only a travel route to a pre-set destination, but also information regarding a course to avoid obstacles ahead of the given vehicle 12, the speed of the given vehicle 12, and so on.

The operation reception section 240 includes functionality to receive signals output from the various input devices 28 when manual driving is being performed based on operation by the occupant of the given vehicle 12. The operation reception section 240 also generates vehicle operation information, this being operation information to control the actuators 30, based on the signals received from the various input devices 28.

The travel control section 250 includes functionality to control autonomous driving based on the travel plan generated by the travel plan generation section 230, remote driving based on the remote operation information received from the remote operation station 16, and manual driving based on the vehicle operation information received from the operation reception section 240.

The compromised state prediction section 260 serves as a prediction section, and includes functionality to predict a compromised state in which autonomous driving by the given vehicle 12 is compromised based on the environmental information acquired from the information server 18 and the vehicle controller device 20 of another vehicle (for example the other vehicle 14) through the communication I/F 20E. Namely, the compromised state prediction section 260 predicts a future compromised state.

Causes of a compromised state may include natural disasters such as meteorological disasters and terrestrial disasters, and man-made disasters such as traffic accidents and fires. Meteorological disasters include flooding, heavy snow, tornadoes, heavy fog, thunderstorms and the like. Terrestrial disasters include earthquakes, tsunamis, landslides, volcanic eruptions, and the like. In the event of a disaster, technical difficulties arise due to poor visibility as a result of water spray, dirt, and the like, and detection issues with the external sensors 24 arise due to noise from vibrations, sounds, and the like. If the external sensors 24 struggle to ascertain the immediate situation, or if feedback from the external sensors 24 cannot be accurately obtained, autonomous driving becomes compromised.

The compromised state prediction section 260 predicts the occurrence of a compromised state when having detected or predicted the occurrence of a disaster based on the environmental information. For example, in cases in which a forecast precipitation amount for a partway point that will be reached on the travel route exceeds a preset threshold, the compromised state prediction section 260 predicts that a compromised state will arise at the partway point. As another example, in cases in which a forecast height of a tsunami caused by an earthquake at a partway point exceeds a preset threshold, the compromised state prediction section 260 predicts that a compromised state will arise at the partway point. Note that the compromised state prediction section 260 treats not only cases in which autonomous driving will become completely impossible as a compromised state, but also treats cases in which the sensitivity of the external sensors 24 will fall below an acceptable range as a compromised state.

When the compromised state prediction section 260 has forecast a compromised state, the compromised state is stored in the storage 20D in a state associated with the environmental information on which this prediction was based. The compromised state prediction section 260 then performs a new compromised state prediction based on the compromised state and the environmental information stored in the storage 20D. For example, in cases in which a compromised state has actually arisen before the preset threshold was exceeded, the compromised state prediction section 260 lowers the threshold setting for the next prediction, and performs a prediction. This improves the prediction accuracy.

The sensor state determination section 270 serves as a state determination section, and includes functionality to determine a peripheral information acquisition state of the external sensors 24 and a vehicle information acquisition state of the internal sensors 26.

The notification section 280 includes functionality to notify the remote operation station 16 of a compromised state in cases in which the compromised state prediction section 260 has predicted that a compromised state will arise.

The information supply section 290 includes functionality to supply information relating to the compromised state of the given vehicle 12 to other vehicles installed with a vehicle controller device 20. For example, in a case in which a natural disaster is forecast on the travel route of the given vehicle 12 such that it will not be possible to continue autonomous driving due to poor visibility or the like, the information supply section 290 is capable of supplying information relating to the compromised state of the given vehicle 12 to the other vehicle 14.

The authority conferring section 300 includes functionality to confer operation authority, this being authority to operate the given vehicle 12 installed with the vehicle controller device 20, on a remote driver to operate the remote operation station 16. When operation authority has been conferred on the remote driver, the vehicle controller device 20 transmits an authority transfer command to the remote operation station 16 operated by the remote driver. The authority transfer command may be transmitted at the same time as compromised state notification is performed, or may be transmitted after the compromised state notification. When operation authority is transferred from the given vehicle 12 to the remote driver, the travel control section 250 of the given vehicle 12 causes the given vehicle 12 to travel based on remote operation information received from the remote operation station 16. Namely, remote driving is performed by the remote driver.

Remote Operation Station

Figure 4:
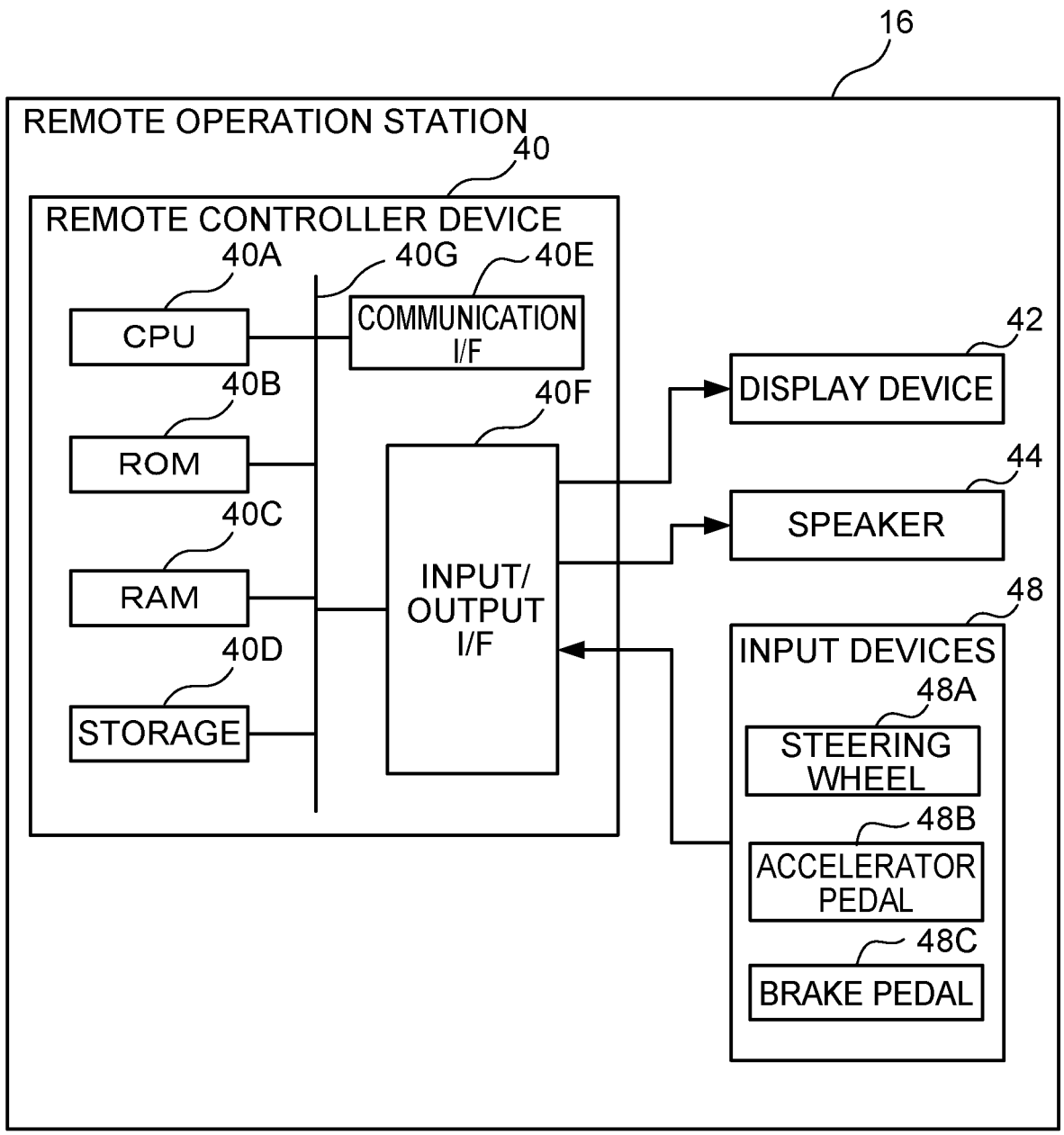
FIG. 4 is a block diagram illustrating hardware configuration of a remote operation station of the first exemplary embodiment.

FIG. 4 is a block diagram illustrating hardware configuration of equipment installed in the remote operation station 16 of the present exemplary embodiment. In addition to the remote controller device 40 previously described, the remote operation station 16 also includes a display device 42, a speaker 44, and input devices 48.

The remote controller device 40 is configured including a CPU 40A, ROM 40B, RAM 40C, storage 40D, a communication I/F 40E and an input/output I/F 40F. The CPU 40A, the ROM 40B, the RAM 40C, the storage 40D, the communication I/F 40E, and the input/output I/F 40F are connected together so as to be capable of communicating with each other through a bus 40G Functionality of the CPU 40A, the ROM 40B, the RAM 40C, the storage 40D, the communication I/F 40E, and the input/output I/F 40F matches that of the CPU 20A, the ROM 20B, the RAM 20C, the storage 20D, the communication I/F 20E, and the input/output I/F 20F of the vehicle controller device 20 previously described. The CPU 40A is an example of a second processor, and the RAM 40C is an example of second memory. The communication I/F 40E is an example of an output section.

Figure 5:
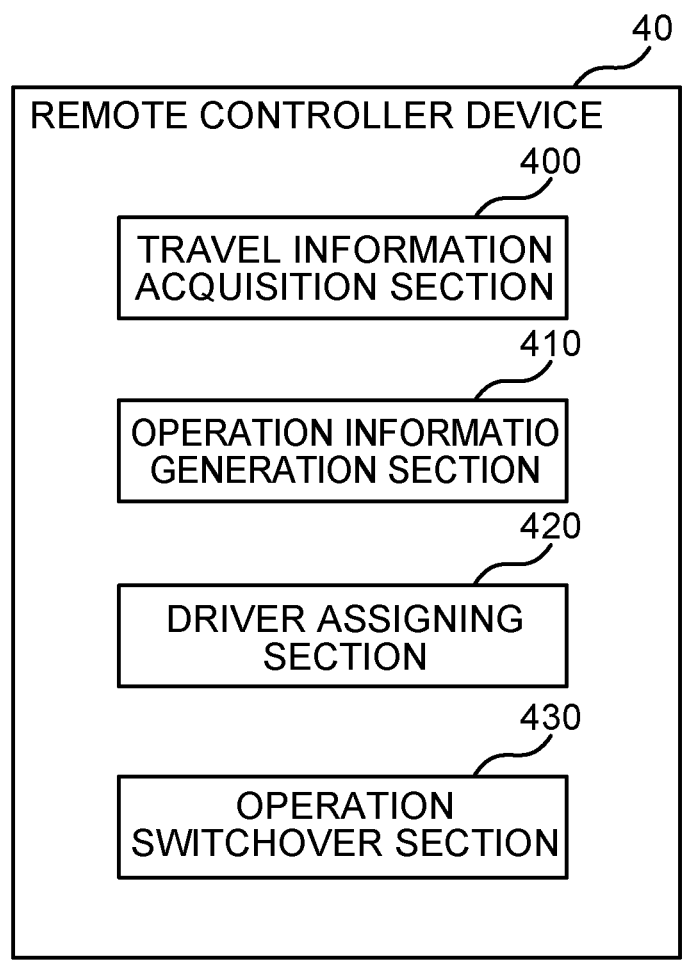
FIG. 5 is a block diagram illustrating an example of functional configuration of a remote controller device station of the first exemplary embodiment.

The CPU 40A reads a program from the ROM 40B and executes the program, using the RAM 40C as a workspace. In the present exemplary embodiment, a processing program is stored in the ROM 40B. When the CPU 40A executes the processing program, the remote controller device 40 functions as a travel information acquisition section 400, an operation information generation section 410, a driver assigning section 420, and an operation switchover section 430, as illustrated in FIG. 5.

The display device 42, the speaker 44, and the input devices 48 are connected to the remote controller device 40 of the present exemplary embodiment through the input/output I/F 40F. Note that the display device 42, the speaker 44, and the input devices 48 may be directly connected to the bus 40G.

The display device 42 is a liquid crystal monitor for displaying an image captured by the camera 24A of the given vehicle 12 and various information relating to the given vehicle 12.

The speaker 44 is a speaker for replaying audio recorded by a microphone attached to the camera 24A of the given vehicle 12 together with the captured image.

The input devices 48 are controllers to be operated by the remote driver serving as a remote operator using the remote operation station 16. The input devices 48 include a steering wheel 48A serving as a switch to steer the steered wheels of the given vehicle 12, an accelerator pedal 48B serving as a switch to cause the given vehicle 12 to accelerate, and a brake pedal 48C serving as a switch to cause the given vehicle 12 to decelerate. Note that the mode of the respective input devices 48 is not limited thereto. For example, a lever switch may be provided instead of the steering wheel 48A. As another example, push button switches or lever switches may be provided instead of the pedal switches of the accelerator pedal 48B or the brake pedal 48C.

FIG. 5 is a block diagram illustrating an example of functional configuration of the remote controller device 40. As illustrated in FIG. 5, the remote controller device 40 includes the travel information acquisition section 400, the operation information generation section 410, the driver assigning section 420, and the operation switchover section 430.

The travel information acquisition section 400 includes functionality to acquire audio as well as the image captured by the camera 24A and transmitted by the vehicle controller device 20, and also acquire vehicle information such as the vehicle speed. The acquired captured image and vehicle information are displayed on the display device 42, and the audio information is output through the speaker 44.

The operation information generation section 410 includes functionality to receive signals output from the various input devices 48 when remote driving is being performed based on operation by the remote driver. The operation information generation section 410 also generates remote operation information to be transmitted to the vehicle controller device 20 based on the signals received from the various input devices 48.

The driver assigning section 420 serves as an assigning section, and includes functionality to assign a remote driver to operate the remote operation station 16. For example, in cases in which plural remote drivers are available, a remote driver conferred with operation authority by the vehicle controller device 20 is assigned as the remote driver to perform operation.

The operation switchover section 430 includes functionality to execute switching of the vehicle controller device 20 to remote driving. When the remote driver to perform remote driving operates a operation section of the remote operation station 16, a switchover signal or a switchover preparation signal is output to the vehicle controller device 20. For example, in cases in which information relating to the operation authority has already been received from the vehicle controller device 20 of the given vehicle 12, the operation switchover section 430 outputs a switchover signal to the vehicle controller device 20 in order to switch the given vehicle 12 from autonomous driving or manual driving to remote driving. As another example, in cases in which the operation switchover section 430 transmits a switchover preparation signal to the vehicle controller device 20 first, the given vehicle 12 switches from autonomous driving or manual driving to remote driving at the stage at which operation authority is conferred by the authority conferring section 300 of the vehicle controller device 20.

Information Server

Figure 6:
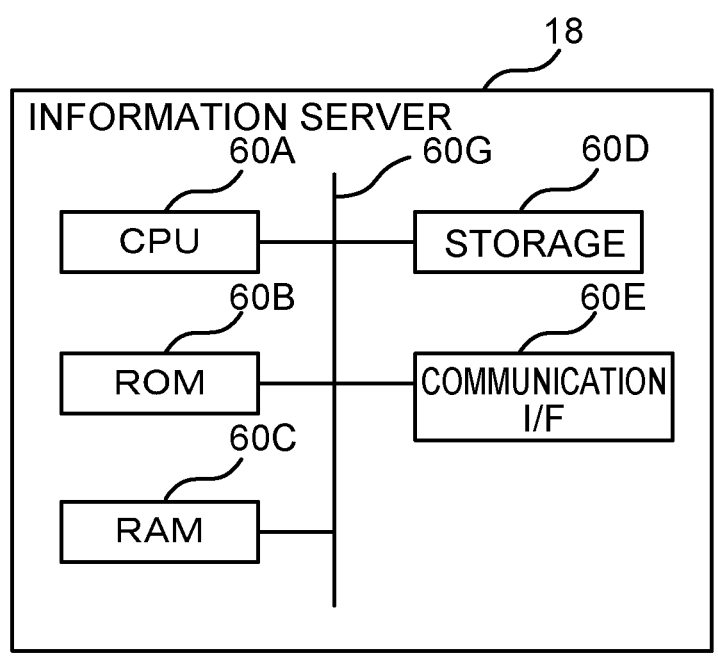
FIG. 6 is a block diagram illustrating hardware configuration of an information server of the first exemplary embodiment.

As illustrated in FIG. 6, the information server 18 is configured including a CPU 60A, ROM 60B, RAM 60C, storage 60D, and a communication I/F 60E. The CPU 60A, the ROM 60B, the RAM 60C, the storage 60D, and the communication I/F 60E are connected together so as to be capable of communicating with each other through a bus 60G Functionality of the CPU 60A, the ROM 60B, the RAM 60C, the storage 60D, and the communication I/F 60E matches that of the CPU 20A, the ROM 20B, the RAM 20C, the storage 20D, and the communication I/F 20E of the vehicle controller device 20 previously described.

The CPU 60A reads a program from the ROM 60B or the storage 60D and executes the program, using the RAM 60C as a workspace. In the present exemplary embodiment, an information processing program is stored in the storage 60D. When the CPU 60A executes the information processing program, the CPU 60A functions as an external information acquisition section 600 and an environmental information generation section 610, as illustrated in FIG. 7.

Figure 7:
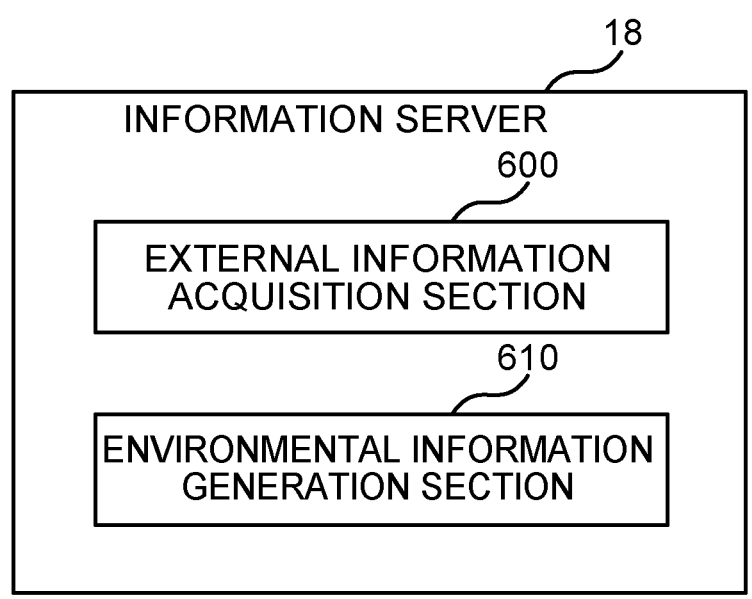
FIG. 7 is a block diagram illustrating an example of functional configuration of an information server of the first exemplary embodiment.

FIG. 7 is a block diagram illustrating an example of functional configuration of the information server 18. As illustrated in FIG. 7, the information server 18 includes the external information acquisition section 600 and the environmental information generation section 610.

The external information acquisition section 600 includes functionality to acquire various information from externally to the information server 18. The acquired information includes environmental information such as meteorological information, earthquake information, and traffic information, news information, and information acquired by the sensors of other vehicles.

The environmental information generation section 610 includes functionality to generate environmental information to be transmitted to the vehicle controller device 20 based on the information acquired by the external information acquisition section 600. For example, from out of the information acquired by the external information acquisition section 600, the environmental information generation section 610 generates current locality peripheral information for the given vehicle 12 to which to transmit environmental information as environmental information destined for the given vehicle 12.

Control Flow

In the vehicle controller device 20 of the present exemplary embodiment, when a compromised state in which autonomous driving will imminently become compromised has been predicted during autonomous driving, handover processing is executed in order to hand over operation to the remote driver at the remote operation station 16. Explanation follows regarding a flow of this handover processing, with reference to the flowcharts of FIG. 8 and FIG. 9.

Figure 8:
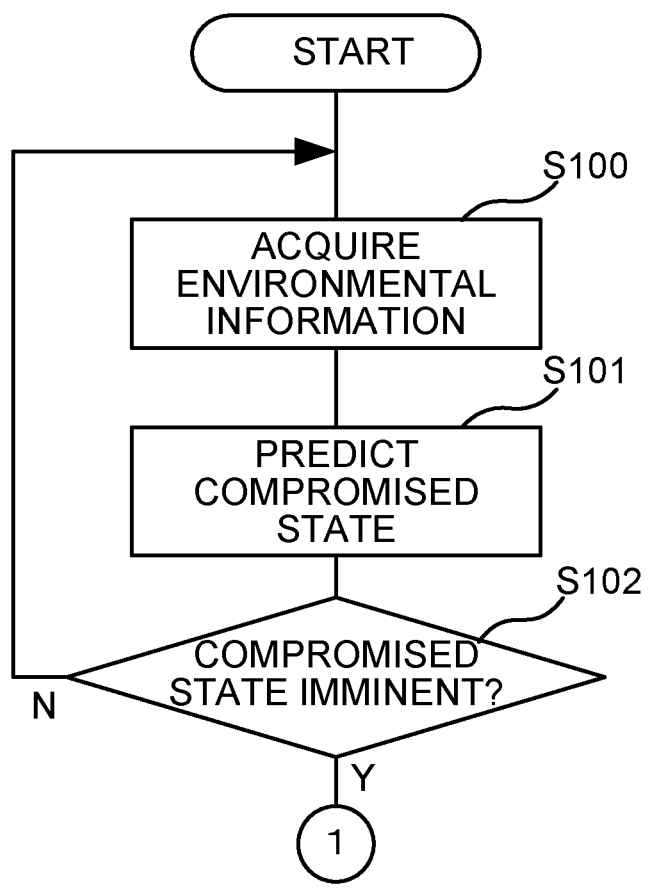
FIG. 8 is a flowchart illustrating a flow of handover processing of the first exemplary embodiment.

At step S100 in FIG. 8, the CPU 20A acquires environmental information from the information server 18 or from the vehicle controller device 20 of the other vehicle 14.

At step S101, the CPU 20A predicts whether or not a compromised state will arise based on the acquired environmental information. The scope of this prediction is not limited to the travel route of the given vehicle 12, and may include a range of a set distance centered on the given vehicle 12.

At step S102, the CPU 20A determines whether or not a compromised state will arise imminently if the given vehicle 12 continues autonomous driving, based on the prediction results of step S101. Processing proceeds to step S103 in FIG. 9 in cases in which the CPU 20A determines that a compromised state will arise imminently. Processing returns to step S100 in cases in which the CPU 20A determines that a compromised state will not arise imminently.

Figure 9:
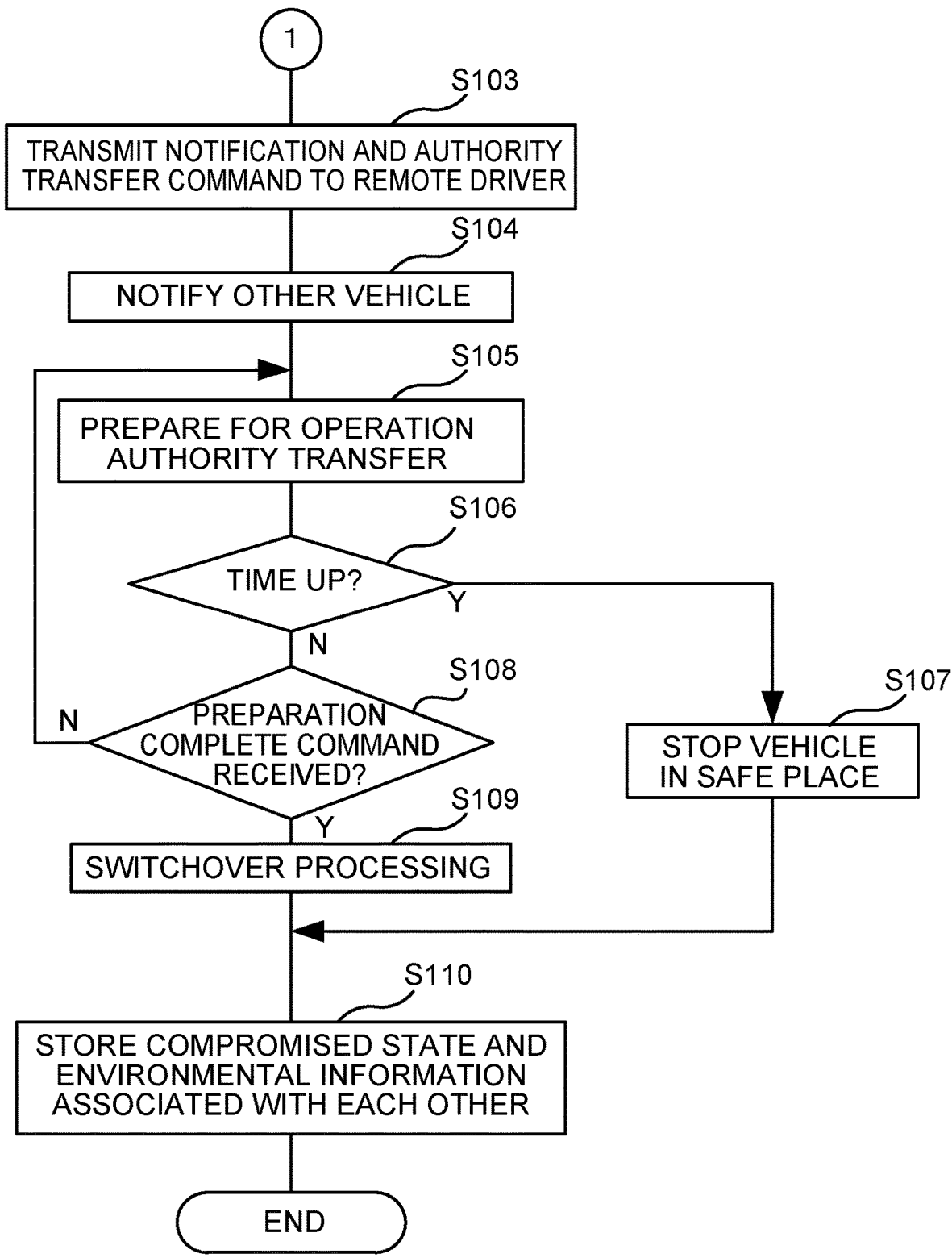
FIG. 9 is a flowchart (continuing from the flowchart of FIG. 8) illustrating a flow of handover processing of the first exemplary embodiment.

At step S103 in FIG. 9, the CPU 20A notifies a pre-designated remote driver that a compromised state will arise imminently, and transmits an authority transfer command relating to remote driving. Specifically, the CPU 20A transmits information about the compromised state and the authority transfer command to the remote operation station 16 to be operated by the remote driver.

At step S104, the CPU 20A notifies the other vehicle 14 that a compromised state will arise imminently. Specifically, the CPU 20A transmits information about the compromised state to the vehicle controller device 20 of the other vehicle 14. If the other vehicle 14 is a vehicle approaching to the point where autonomous driving is forecast to become compromised, for example a following vehicle, the other vehicle 14 is able to ascertain that autonomous driving will shortly be compromised.

At step S105, the CPU 20A prepares for operation authority transfer. Specifically, the CPU 20A informs the occupant inside the given vehicle 12 of the transfer from autonomous driving to remote driving. The CPU 20A also waits to receive a preparation complete command from the remote operation station 16 indicating that preparation for remote driving by the remote driver is complete.

At step S106, the CPU 20A determines whether or not a pre-set waiting time has elapsed, namely determines whether or not time is up. Processing proceeds to step S107 in cases in which the CPU 20A determines that time is up. Processing proceeds to step S108 in cases in which the CPU 20A determines that time is not up.

At step S107, the CPU 20A performs control to stop the given vehicle 12 in a safe place. Processing then proceeds to step S110.

At step S108, the CPU 20A determines whether or not the preparation complete command has been received. Processing proceeds to step S109 in cases in which the CPU 20A determines that the preparation complete command has been received. Processing returns to step S105 in cases in which the CPU 20A determines that the preparation complete command has not been received.

At step S109, the CPU 20A executes switchover processing to switch from autonomous driving to remote driving.

At step S110, the CPU 20A stores the compromised state prediction result from step S101 and the environmental information on which this compromised state prediction was based in an associated state in the storage 20D. The stored compromised state result and environmental information are employed the next time a compromised state is predicted. Namely, in cases in which an actual compromised state result differs from the environmental information-based prediction, the prediction conditions are modified in order to improve the accuracy of the compromised state prediction. The CPU 20A then ends the handover processing.

Figure 10:
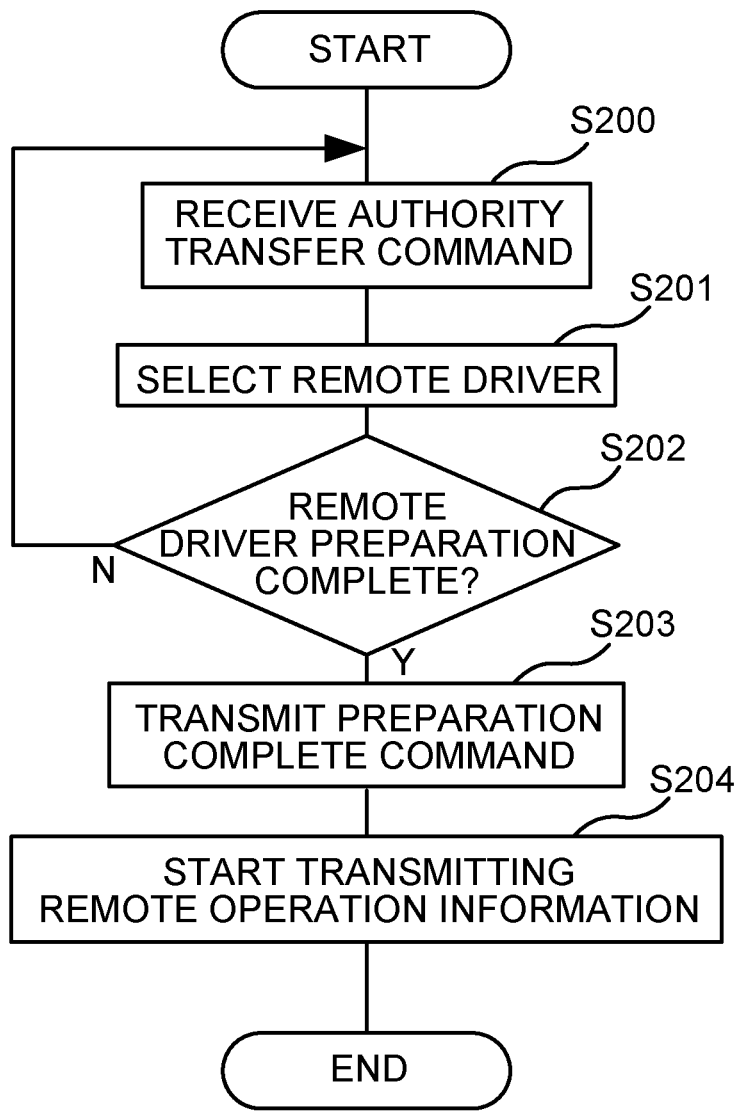
FIG. 10 is a flowchart illustrating a flow of takeover processing of the first exemplary embodiment.

Next, explanation follows regarding a flow of takeover processing executed by the remote controller device 40 of the remote operation station 16, with reference to the flowchart in FIG. 10.

At step S200 in FIG. 10, the CPU 40A receives the authority transfer command transmitted from the vehicle controller device 20.

At step S201, the CPU 40A selects a pre-designated remote driver from among plural remote drivers.

At step S202, the CPU 40A determines whether or not the remote driver has completed preparation. More specifically, the CPU 40A determines whether or not it is possible for the selected remote driver to sit in a seat of the remote operation station 16 and perform remote operation. Note that preparation is considered not to have been completed in cases in which a remote driver cannot be selected or secured. Processing proceeds to the next step S203 in cases in which the CPU 40A determines that the preparation by the remote driver is complete. Processing returns to step S200 in cases in which the CPU 40A determines that the preparation by the remote driver is not complete.

At step S203, the CPU 40A transmits a preparation complete command indicating that preparation for remote operation by the remote driver is complete to the vehicle controller device 20 of the given vehicle 12.

At step S204, the CPU 40A starts transmitting remote operation information. Specifically, the CPU 40A acquires signals from the input devices 48 accompanying operation by the remote driver, and transmits remote operation information generated based on the acquired signals to the vehicle controller device 20. Remote driving of the given vehicle 12 is implemented in this manner. The CPU 40A then ends the takeover processing.

In the exemplary embodiment described above, the remote operation station 16 is notified that a compromised state will arise in cases in which autonomous driving of the given vehicle 12 is forecast to become compromised based on environmental information. Accordingly, the notified remote operation station 16 is able to start remote driving by a designated remote driver. The vehicle controller device 20 of the present exemplary embodiment is capable of maintaining travel of the given vehicle 12 by remote driving even in cases in which the external sensors 24 and the like will stop functioning due to a natural disaster or man-made disaster predicted to occur in the near future.

Note that although remote driving is set so as to be performed by a pre-designated remote driver in the present exemplary embodiment, there is no limitation to designating a single remote driver, and plural remote drivers may be designated. In such cases, setting may be made such that at step S201 a remote driver who is not currently performing remote operation is prioritized for selection from amongst the plural designated remote driver candidates.

Second Exemplary Embodiment

In the first exemplary embodiment, handover processing is executed in cases in which autonomous driving is predicted to become compromised in the near future. In a second exemplary embodiment, handover processing is executed in cases in which autonomous driving is currently compromised. Explanation follows regarding points that differ from the first exemplary embodiment.

The sensor state determination section 270 of the present exemplary embodiment determines a compromised state to exist in cases in which determination is made that some or all of the peripheral information and vehicle information cannot be acquired, hindering autonomous driving. Namely, the sensor state determination section 270 determines that the given vehicle 12 is currently in a compromised state based on the vehicle information for the given vehicle 12. Note that the sensor state determination section 270 determines a compromised state to exist not only in cases in which neither the peripheral information nor the vehicle information can be acquired, but also in cases in which the accuracy or quantity of the acquired peripheral information or vehicle information falls below an acceptable range.

The notification section 280 of the present exemplary embodiment includes functionality to notify the remote operation station 16 of the compromised state in cases in which the sensor state determination section 270 has determined a compromised state to exist.

Figure 11:
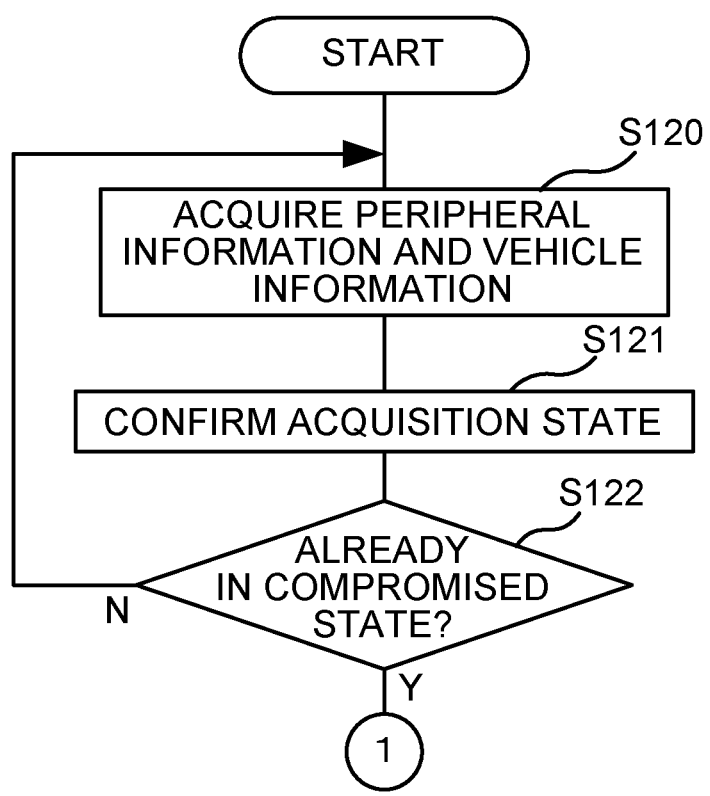
FIG. 11 is a flowchart illustrating a flow of handover processing of a second exemplary embodiment.

Explanation follows regarding a flow of the handover processing of the second exemplary embodiment, with reference to the flowchart of FIG. 11.

At step S120 in FIG. 11, the CPU 20A acquires the peripheral information from the external sensors 24, and also acquires the vehicle information from the internal sensors 26. Step S120 is executed during the course of processing relating to autonomous driving.

At step S121, the CPU 20A determines an acquisition state of the peripheral information and the vehicle information. Namely, the CPU 20A confirms whether or not all of the peripheral information and the vehicle information necessary for autonomous driving is being acquired correctly.

At step S122, the CPU 20A determines whether or not the given vehicle 12 is already in a compromised state. Processing proceeds to step S103 in FIG. 9 in cases in which the CPU 20A determines that a compromised state already exists. Processing returns to step S120 in cases in which the CPU 20A determines that a compromised state has not yet arisen.

The flow of processing following step S103 is similar to that of the handover processing of the first exemplary embodiment (see FIG. 9).

In the present exemplary embodiment, the remote operation station 16 is notified that a compromised state currently exists in cases in which the peripheral information cannot be acquired correctly by the external sensors 24. The remote operation station 16 notified of the compromised state is thus able to start remote driving by a designated remote driver. The vehicle controller device 20 of the present exemplary embodiment is capable of maintaining travel of the given vehicle 12 by remote driving in cases in which the external sensors 24 are not functioning due to a natural disaster or man-made disaster that is currently occurring.

Third Exemplary Embodiment

In a third exemplary embodiment, processing relating to a current compromised state and processing relating to a future compromised state are both executed during handover processing. Explanation follows regarding a flow of the handover processing of the third exemplary embodiment, with reference to the flowchart of FIG. 12.

Figure 12:
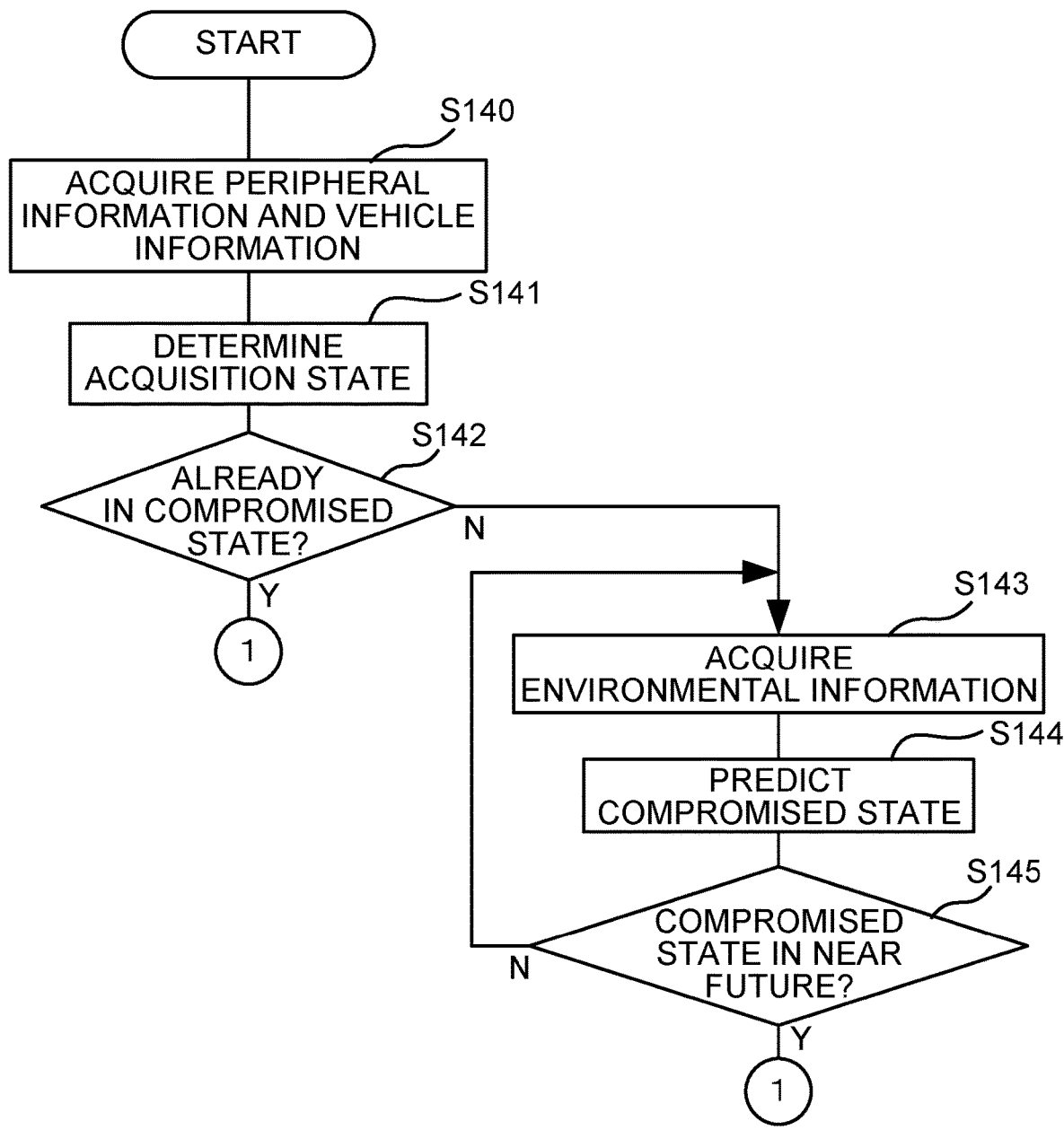
FIG. 12 is a flowchart illustrating a flow of handover processing of a third exemplary embodiment.

The flow from step S140 to step S142 in FIG. 12 is similar to that from step S120 to step S122 in FIG. 11. Processing proceeds to step S103 in FIG. 9 in cases in which the CPU 20A determines that a compromised state already exists. Processing proceeds to step S143 in cases in which the CPU 20A determines that a compromised state has not yet arisen.

The flow from step S143 to step S145 is similar to that from step S100 to step S102 in FIG. 8. Processing proceeds to step S103 in FIG. 9 in cases in which the CPU 20A determines that a compromised state will arise imminently. Processing returns to step S143 in cases in which the CPU 20A determines that a compromised state will not arise imminently.

The handover processing of the present exemplary embodiment exhibits the advantageous effects of both the first exemplary embodiment and the second exemplary embodiment. Namely, the vehicle controller device 20 of the present exemplary embodiment is capable of maintaining travel of the given vehicle 12 both in cases in which the external sensors 24 and so on will stop functioning in the event of a disaster predicted to occur in the near future, and in cases in which the external sensors 24 have stopped functioning in the event of a disaster that is currently occurring.

Notes

Although explanation has been given in which the remote driver handling the given vehicle 12 serves as a remote operator performing remote operation in the exemplary embodiments described above, there is no limitation thereto. An operator issuing instructions relating to the course, speed, and the like of the given vehicle 12 may be present as a remote operator performing remote operation.

In the exemplary embodiments described above, the vehicle controller device 20 confers operation authority on the remote driver. However, there is no limitation thereto and configuration may be made such that driving of the given vehicle 12 is taken on by a remote driver who has received the compromised state notification, namely such that the remote operation station 16 acquires the operation authority. In such cases, the operation switchover section 430 serves as an undertaking section that takes on the operation authority of the given vehicle 12 from the vehicle controller device 20. More specifically, in cases in which the operation switchover section 430 has acquired information relating to a compromised state from the vehicle controller device 20, the operation switchover section 430 sends a request command relating to authority transfer to the vehicle controller device 20, and thereby acquires the authority transfer command from the vehicle controller device 20.

In the takeover processing of the respective exemplary embodiments, the remote controller device 40 selects a pre-designated remote driver from among plural remote drivers (step S201). Note that the plural remote drivers may share a single remote operation station 16, or alternatively each of the remote drivers may employ an allocated remote operation station 16. In cases in which a different remote operation station 16 is allocated to each remote driver, the takeover processing may sometimes result in a remote driver at a different remote operation station 16 to a remote operation station 16 that performed the takeover processing being selected. In such cases, configuration may be made such that the vehicle controller device 20 of the given vehicle 12 is notified of the remote operation station 16 of the selected remote driver, such that the vehicle controller device 20 transmits a new authority transfer command to the remote operation station 16 of the selected remote driver. Alternatively, the remote operation station 16 that performed the takeover processing may forward the authority transfer command to the remote operation station 16 of the selected remote driver. The remote operation station 16 of the selected remote driver acquires the authority transfer command of the given vehicle 12 in order to implement remote driving of the given vehicle 12 by remote operation by the remote driver at the remote operation station 16.

Although compromised state prediction is executed by the vehicle controller device 20 in the handover processing of the first and third exemplary embodiments, this may be executed by the information server 18. Moreover, although the takeover processing is executed by the remote controller device 40 in the first exemplary embodiment, this may be executed by the information server 18.

Note that the handover processing executed by the CPU 20A reading software (a program), and the takeover processing executed by the CPU 40A reading software (a program) in the exemplary embodiments described above may be executed by various processors other than CPUs. Examples of such processors include programmable logic devices (PLDs) such as field-programmable gate arrays (FPGAs) that have a circuit configuration that can be modified following manufacture, or dedicated electrical circuits, these being processors such as application specific integrated circuits (ASICs) that have a custom designed circuit configuration to execute specific processing. The handover processing and the takeover processing may be executed using one of these processors, or may be executed by a combination of two or more processors of the same type or different types to each other (for example a combination of plural FPGAs, or a combination of a CPU and an FPGA). A more specific example of a hardware structure of these various processors is electric circuitry combining circuit elements such as semiconductor elements.

The exemplary embodiments described above describe a format in which the programs are stored (installed) in advance on a non-transitory computer-readable recording medium. For example, the execution program employed by the vehicle controller device 20 of the autonomous driving-enabled vehicles 11 is stored in advance in the ROM 20B. The processing program employed by the remote controller device 40 of the remote operation station 16 is stored in advance in the ROM 40B. However, there is no limitation thereto, and the respective programs may be provided in a format recorded on a non-transitory recording medium such as compact disc read only memory (CD-ROM), digital versatile disc read only memory (DVD-ROM), or universal serial bus (USB) memory. Alternatively, the respective programs may be configured in a format to be downloaded from an external device through a network.

The flows of processing in the exemplary embodiments described above are given as examples, and unnecessary steps may be omitted, new steps added, and the processing sequence rearranged within a range not departing from the spirit thereof

What is claimed is:
1. A vehicle controller device comprising:
a communication section configured to receive meteorological information and operation information to operate a vehicle from an operation device located externally to the vehicle;
a first memory configured to store:
environmental information including the meteorological information; and
in association with the environmental information, a prediction result of a compromised state in which autonomous driving of the vehicle becomes compromised when occurrence of a disaster has been detected or predicted based on the environmental information; and
a first processor that is coupled to the first memory and the communication section, the first processor being configured to:
acquire peripheral information regarding a periphery of the vehicle from a peripheral information detection section;
generate a travel plan for the vehicle based on the peripheral information of the vehicle;
control autonomous driving in which the vehicle travels based on the generated travel plan and also control remote driving in which the vehicle travels based on the received operation information;
predict the compromised state when a value obtained from the environmental information exceeds a threshold value that is based on the prediction result stored in the first memory;
when the compromised state has occurred before the value has exceeded the threshold value:
lower the threshold value for a subsequent prediction; and
predict the compromised state based on the lowered threshold value; and
while the vehicle travels in the autonomous driving and when the first processor has predicted the compromised state, transmit a command requesting to start the remote driving to the operation device.

2. The vehicle controller device of claim 1, wherein the first processor is further configured to:
    determine whether or not the compromised state currently exists based on an acquisition state of the peripheral information; and
    notify the operation device of the compromised state when the compromised state has been determined to exist.

3. The vehicle controller device of claim 1, wherein the communication section is configured to transmit information relating to the compromised state to another vehicle at the periphery of the vehicle.

4. The vehicle controller device of claim 1, wherein:
    the first processor is further configured to confer authority to operate the vehicle on a remote operator that operates the operation device; and
    the communication section is further configured to receive the operation information from the operation device operated by the remote operator conferred with the authority.

5. A vehicle control system comprising:
    the vehicle controller device of claim 4; and
    the operation device including:
        a second memory;
        a second processor coupled to the second memory and configured to assign the remote operator to be conferred with the authority from among a plurality of remote operators; and
        an output section configured to output a preparation complete command indicating that the assigned remote operator has completed preparation for remote driving,
    wherein the communication section of the vehicle controller device is configured to receive the preparation complete command, and then receive the operation information from the operation device operated by the remote operator conferred with the authority.

6. A vehicle control system comprising:
    the vehicle controller device of claim 1; and
    the operation device comprising:
        a second memory; and
        a second processor that is coupled to the second memory, the second processor being configured to take on authority to operate the vehicle from the vehicle controller device that has provided notification of the compromised state.

7. A method of controlling a vehicle using a vehicle controller having a communication section, a first memory, and a first processor, the method comprising:
    using the communication section, receiving meteorological information and operation information to operate a vehicle from an operation device located externally to the vehicle;
    using the first memory, storing:
        environmental information including the meteorological information; and
        in association with the environmental information, a prediction result of a compromised state in which autonomous driving of the vehicle becomes compromised when occurrence of a disaster has been detected or predicted based on the environmental information;
    using the first processor, acquiring peripheral information regarding a periphery of the vehicle from a peripheral information detection section;
    using the first processor, generating a travel plan for the vehicle based on the peripheral information of the vehicle;
    using the first processor, controlling autonomous driving in which the vehicle travels based on the generated travel plan and also controlling remote driving in which the vehicle travels based on the received operation information;
    using the first processor, predicting the compromised state when a value obtained from the environmental information exceeds a threshold value that is based on the prediction result stored in the first memory;
    using the first processor, when the compromised state has occurred before the value has exceeded the threshold value:
        lower the threshold value for a subsequent prediction; and
        predict the compromised state based on the lowered threshold value; and
    using the first processor, while the vehicle travels in the autonomous driving and when the first processor has predicted the compromised state, transmitting a command requesting to start the remote driving to the operation device.

8. The method of claim 7, further comprising:
    using the first processor, determining whether or not the compromised state currently exists based on an acquisition state of the peripheral information; and
    using the first processor, notifying the operation device of the compromised state when the compromised state has been determined to exist.

9. The method of claim 7, further comprising:
    using the communication section, transmitting information relating to the compromised state to another vehicle at the periphery of the vehicle.

10. The method of claim 7, further comprising:
    using the first processor, conferring authority to operate the vehicle on a remote operator that operates the operation device; and
    using the communication section, receiving the operation information from the operation device operated by the remote operator conferred with the authority.

11. The method of claim 10, wherein the operation device includes a second processor and an output section, further comprising:
    using the second processor, assigning the remote operator to be conferred with the authority from among a plurality of remote operators;
    using the output section, outputting a preparation complete command indicating that the assigned remote operator has completed preparation for remote driving; and
    using the communication section, receiving the preparation complete command, and then receiving the operation information from the operation device operated by the remote operator conferred with the authority.

12. The method of claim 7, wherein the operation device includes a second processor, further comprising:
    using the second processor, taking on authority to operate the vehicle from the vehicle controller device that has provided notification of the compromised state.

13. A non-transitory computer readable medium storing a program configured to cause a processor to:
    acquire peripheral information regarding a periphery of a vehicle from a peripheral information detection section;

generate a travel plan for the vehicle based on the peripheral information of the vehicle;
control autonomous driving in which the vehicle travels based on the generated travel plan and also control remote driving in which the vehicle travels based on operation information to operate the vehicle received from an operation device located externally to the vehicle via a communication section;
acquire from a first memory:
  environmental information including meteorological information; and
  a prediction result of a compromised state in which autonomous driving of the vehicle becomes compromised when occurrence of a disaster has been detected or predicted based on the environmental information;
predict the compromised state when a value obtained from the environmental information exceeds a threshold value that is based on the prediction result;
when the compromised state has occurred before the value has exceeded the threshold value:
  lower the threshold value for a subsequent prediction; and
  predict the compromised state based on the lowered threshold value; and
while the vehicle travels in the autonomous driving and when the processor has predicted the compromised state, transmit a command requesting to start the remote driving to the operation device.

14. The medium of claim 13, wherein the program is configured to cause the processor to:
  determine whether or not the compromised state currently exists based on an acquisition state of the peripheral information; and
  notify the operation device of the compromised state when the compromised state has been determined to exist.

15. The medium of claim 13, wherein the program is configured to cause the processor to:
  transmit information relating to the compromised state to another vehicle at the periphery of the vehicle via the communication section.

16. The medium of claim 13, wherein the program is configured to cause the processor to:
  confer authority to operate the vehicle on a remote operator that operates the operation device; and
  receive the operation information from the operation device operated by the remote operator conferred with the authority via the communication section.

* * * * *